United States Patent
Dave et al.

(10) Patent No.: US 9,697,092 B2
(45) Date of Patent: Jul. 4, 2017

(54) FILE-BASED CLUSTER-TO-CLUSTER REPLICATION RECOVERY

(71) Applicant: International Business Machines Corporation, Armonk, NY (US)

(72) Inventors: Abhishek S. Dave, Pune (IN); Ajay Singh, Goarakhpur (IN)

(73) Assignee: International Business Machines Corporation, Armonk, NY (US)

(*) Notice: Subject to any disclaimer, the term of this patent is extended or adjusted under 35 U.S.C. 154(b) by 83 days.

(21) Appl. No.: 14/836,999

(22) Filed: Aug. 27, 2015

(65) Prior Publication Data
US 2017/0060701 A1 Mar. 2, 2017

(51) Int. Cl.
G06F 11/00 (2006.01)
G06F 11/14 (2006.01)
G06F 17/30 (2006.01)

(52) U.S. Cl.
CPC ...... *G06F 11/1471* (2013.01); *G06F 11/1451* (2013.01); *G06F 17/30212* (2013.01); *G06F 17/30215* (2013.01); *G06F 2201/80* (2013.01); *G06F 2201/805* (2013.01); *G06F 2201/84* (2013.01)

(58) Field of Classification Search
CPC ........... G06F 11/1471; G06F 17/30215; G06F 2201/80; G06F 2201/805; G06F 2201/84
See application file for complete search history.

(56) References Cited

U.S. PATENT DOCUMENTS

| | | | |
|---|---|---|---|
| 7,039,661 B1* | 5/2006 | Ranade | G06F 17/30575 707/610 |
| 8,166,097 B2 | 4/2012 | Riley et al. | |
| 2011/0196664 A1* | 8/2011 | Zunger | G06F 17/30215 703/21 |
| 2013/0024722 A1* | 1/2013 | Kotagiri | G06F 11/1004 714/6.1 |
| 2014/0032495 A1 | 1/2014 | Erofeev | |
| 2015/0261468 A1* | 9/2015 | Khoyi | G06F 11/00 711/114 |
| 2016/0259836 A1* | 9/2016 | Heathorn | G06F 17/30215 |

OTHER PUBLICATIONS

"Clustered file system", Wikipedia, page last modified on Jun. 25, 2015, at 05:48, 6 pages, <https://en.wikipedia.org/wiki/Clustered_file_system>.
"Journaling file system", Wikipedia, page last modified on May 28, 2015, at 14:35, 5 pages, <https://en.wikipedia.org/wiki/Journaling_file_system>.
Dave et al., "File-Based Cluster-To-Cluster Replication Recovery" U.S. Appl. No. 15/058,544 filed Mar. 2, 2016.
Appendix P—List of Patents or Patent Applications Treated as Related, Filed Mar. 3, 2016, 2 pages.

* cited by examiner

*Primary Examiner* — Joshua P Lottich
(74) *Attorney, Agent, or Firm* — David B. Woycechowsky (57) ABSTRACT

Resiliency in file replication scenarios via maintenance of multiple replication queues with differing susceptibility to various sources of data loss. A plurality of requests are received at a first file system location to write to one or more file system objects at the first file system location. Details about the plurality of requests are recorded in at least two replication queues which differ, at least in part, as to types of failures which will cause data loss. Responsive to detection of data loss in one of the replication queues, details about the plurality of requests are retrieved from another of the replication queues.

20 Claims, 6 Drawing Sheets

FILE-BASED CLUSTER-TO-CLUSTER REPLICATION RECOVERY

BACKGROUND

The present invention relates generally to the field of file system management, and more particularly to file change replication in clustered file systems.

The Wikipedia entry for "Clustered_file_system" as of Apr. 20, 2015 states as follows: "A clustered file system is a file system which is shared by being simultaneously mounted on multiple servers . . . . Clustered file systems can provide features like location-independent addressing and redundancy which improve reliability or reduce the complexity of the other parts of the cluster. Parallel file systems are a type of clustered file system that spread data across multiple storage nodes, usually for redundancy or performance . . . . A shared-disk filesystem uses a storage-area network (SAN) to provide direct disk access from multiple computers at the block level. Access control and translation from file-level operations that applications use to block-level operations used by the SAN must take place on the client node. The most common type of clustered filesystem[ ] is [a] shared-disk filesystem, which—by adding mechanisms for concurrency control—provides a consistent and serializable view of the file system, avoiding corruption and unintended data loss even when multiple clients try to access the same files at the same time. It is a common practice for shared-disk filesystems to employ some sort of a fencing mechanism to prevent data corruption in case of node failures, because an unfenced device can cause data corruption if it loses communication with its sister nodes, and tries to access the same information other nodes are accessing."

The Wikipedia entry for "Journaling_file_system" as of Apr. 20, 2015 states as follows: "A journaling file system . . . keeps track of the changes that will be made in a journal . . . before committing them to the main file system . . . . Updating file systems to reflect changes to files and directories . . . makes it possible for an interruption (like a power failure or system crash) between writes to leave data structures in an invalid intermediate state . . . . Detecting and recovering from such inconsistencies normally requires a complete walk of [the file system's] data structures . . . . If the file system is large and if there is relatively little I/O bandwidth, this can take a long time and result in longer downtimes if it blocks the rest of the system from coming back online. To prevent this, a journaled file system allocates a special area—the journal—in which it records the changes it will make ahead of time. After a crash, recovery simply involves reading the journal from the file system and replaying changes from this journal until the file system is consistent again."

SUMMARY

According to an aspect of the present invention, there is a computer-implemented method, computer program product and/or computer system that performs the following operations (not necessarily in the following order): (i) receives, at a first file system location, a plurality of requests to write to one or more file system objects at the first file system location; (ii) records details about the plurality of requests in both a primary and a secondary replication queue; and (iii) responsive to detection of data loss in the primary replication queue, retrieves the details about the plurality of requests from the secondary replication queue. Both the primary and the secondary replication queues are at the first file system location. The primary and secondary queues differ, at least in part, as to types of failures which will cause data loss.

DETAILED DESCRIPTION

Some embodiments of the present invention create resiliency in file replication scenarios by maintaining multiple replication queues with differing susceptibility to various sources of data loss—for example, a secondary replication queue can be maintained as a file system object stored in non-volatile storage of the file system. In some embodiments of the present invention, such an arrangement permits recovery from a failure of one of the queues without requiring a scan of the whole file system.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational actions to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
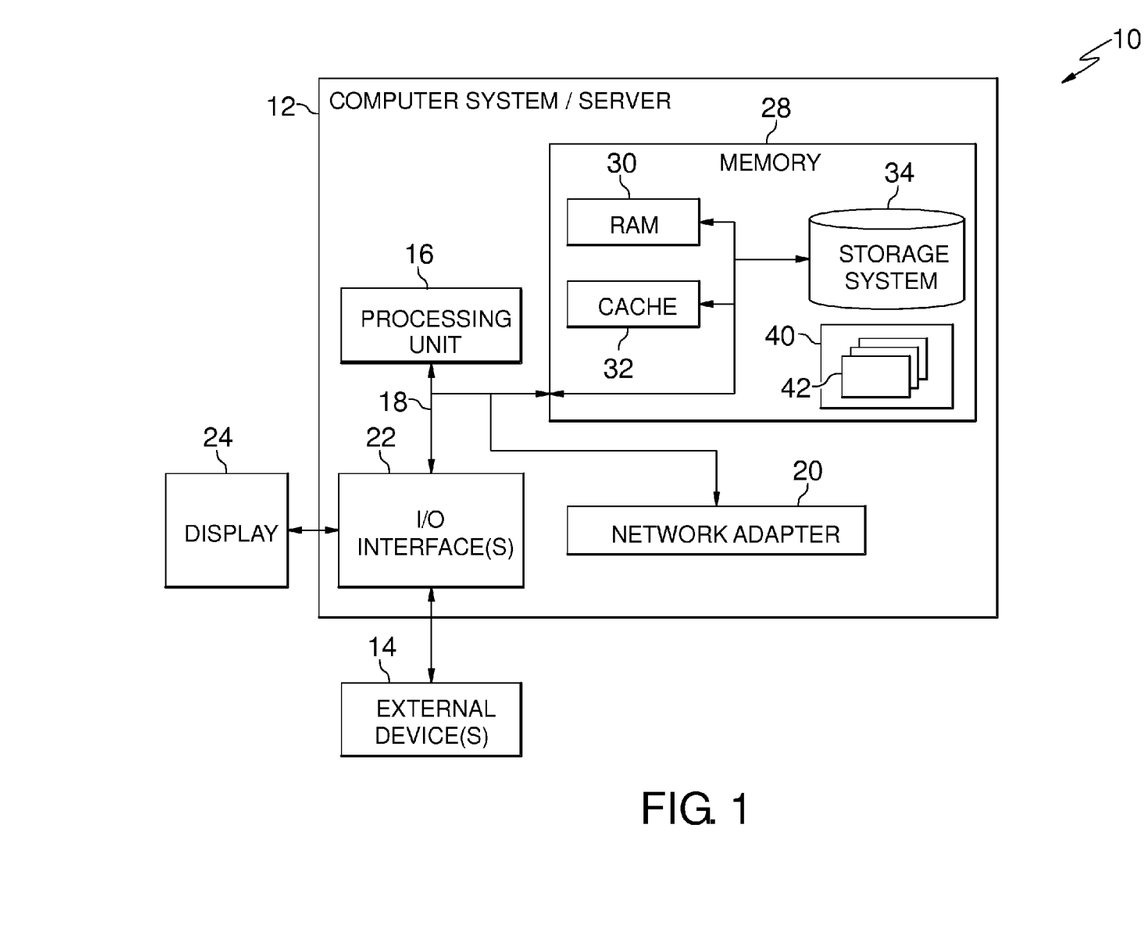
FIG. 1 depicts a cloud computing node used in a first embodiment of a system according to the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
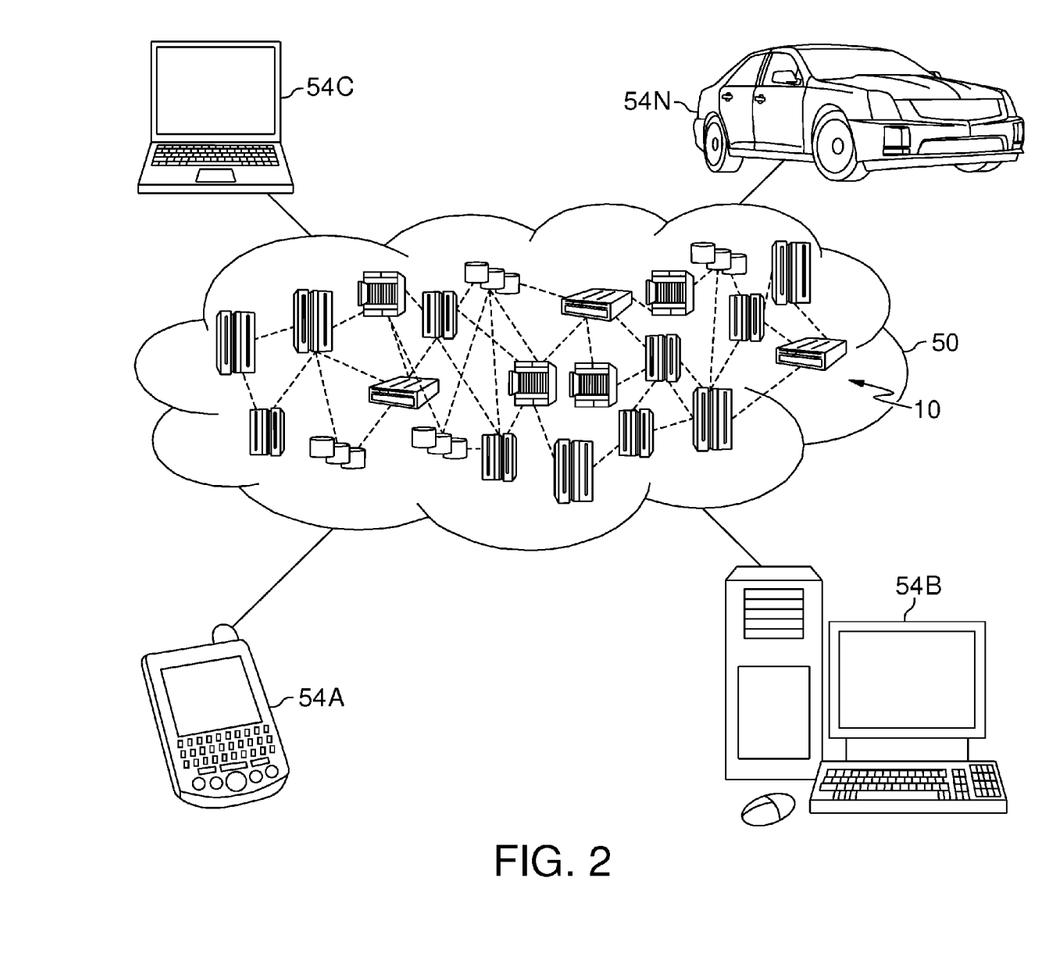
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
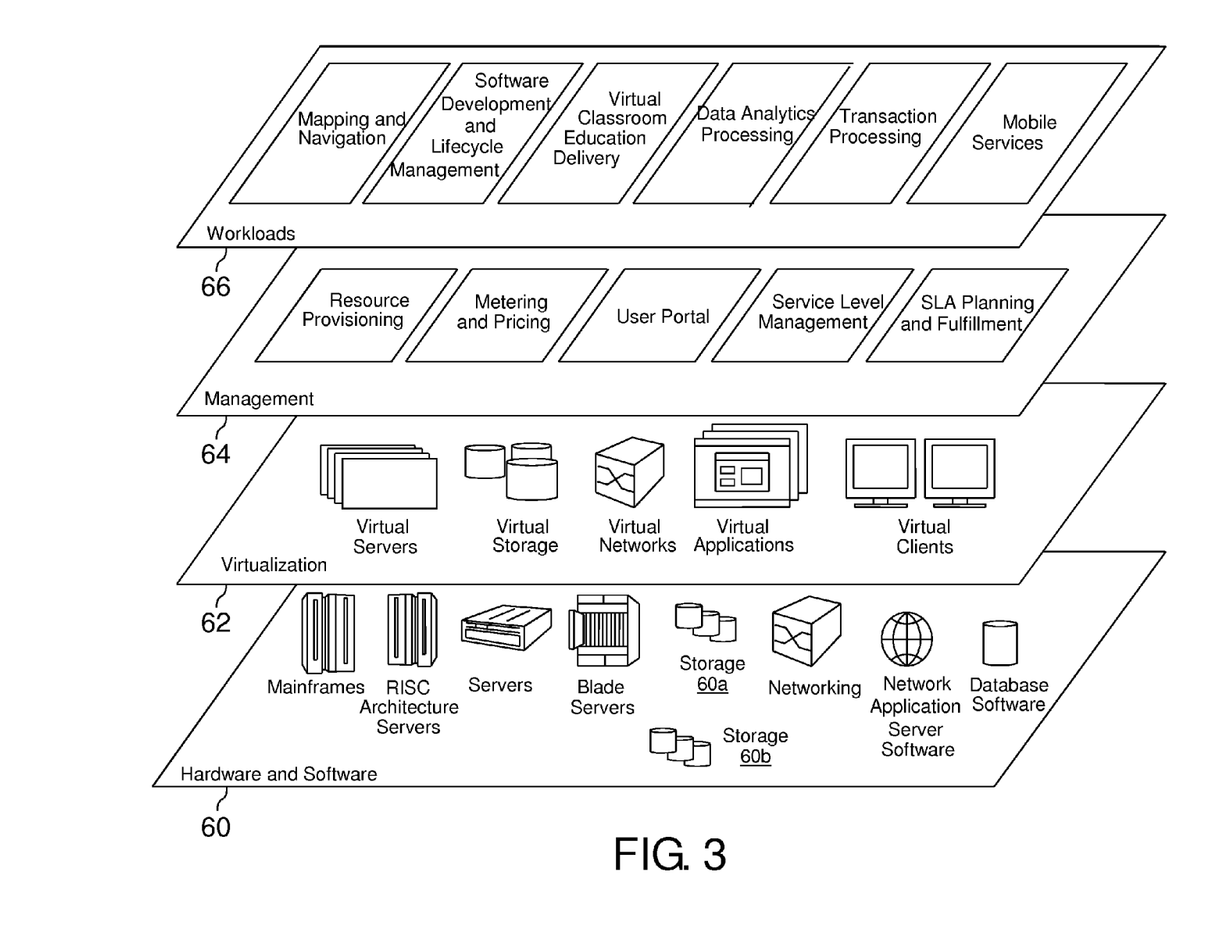
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile services.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 4:
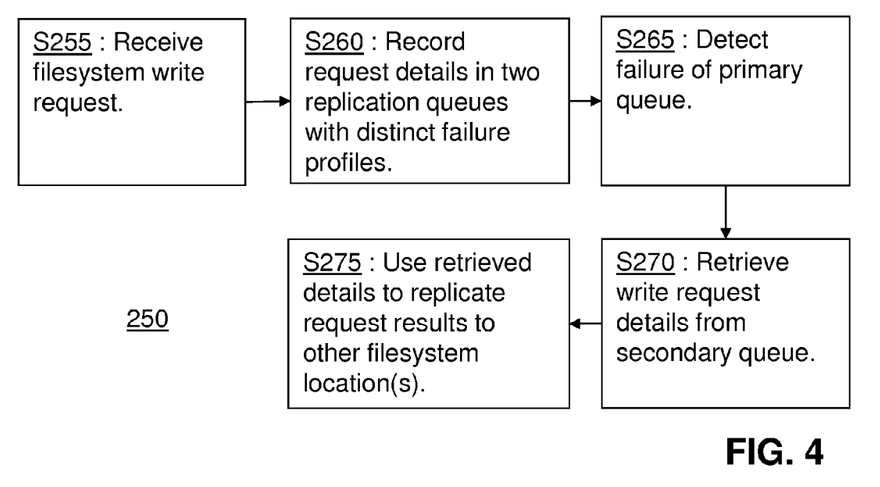
FIG. 4 is a flowchart showing a first embodiment method performed, at least in part, by the first embodiment system.
Figure 5:
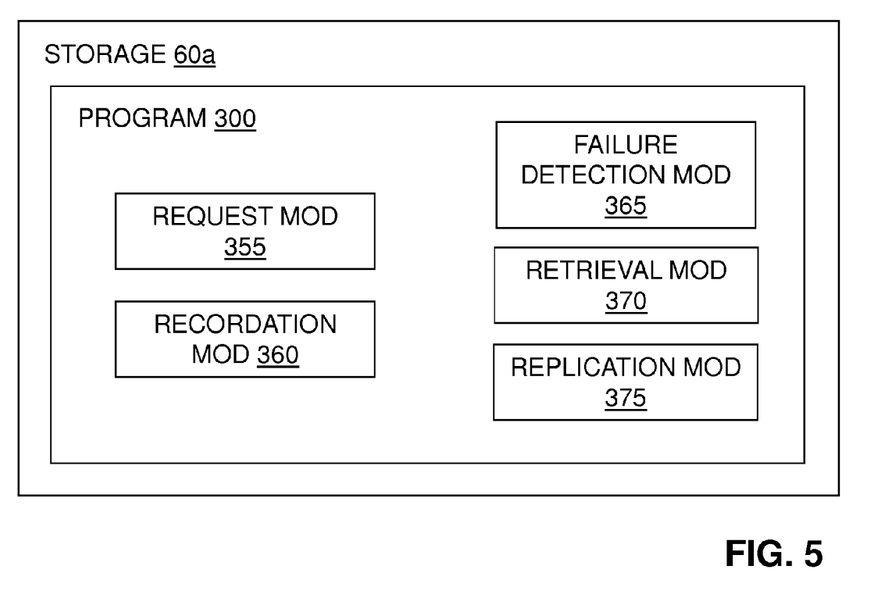
FIG. 5 is a block diagram showing a machine logic (for example, software) portion of the first embodiment system.

FIG. 4 shows flowchart 250 depicting a method according to the present invention. FIG. 5 shows program 300 for performing at least some of the method operations of flowchart 250. This method and associated processing modules will now be discussed, over the course of the following paragraphs, with extensive reference to FIG. 4 (for the method operation blocks) and FIG. 5 (for the modules). One physical location where program 300 of FIG. 5 may be stored is in storage block 60a (see FIG. 3).

Processing begins at operation S255, where request module ("mod") 355 receives a request to write to a file system object. A write request is any request that attempts to effectively modify logically pertinent characteristics of an object, such as by creating or deleting the object, or replacing, rearranging, or adding or removing information from it. Such modification may involve actual changes to the object's data (for example, appending the string "apple" to a file containing a list of fruits), or only to its metadata (for example, deleting the string "apple" from a file by removing a reference of that file to a block of storage containing the string "apple" without actually deleting the string from that storage block). The object is typically a file, but may also be, for example, a directory, such as when a file is moved from one directory to another. The file system in this embodiment is a clustered file system, with physical storage 60a included in one node of the file system and physical storage 60b (see FIG. 3) included in another node. Alternatively, the file system may be a standard file system using only physical storage 60a. The write request is executed on the file system object in the conventional way.

Processing proceeds to operation S260, where recordation mod 360 records details of the request in two replication queues, a primary queue and a secondary queue. In this embodiment, the primary queue is in the fast but volatile memory of the file system's physical server machine. The secondary queue is stored as a file system object in physical storage 60a. The primary queue and the secondary queue therefore have different risk profiles with respect to events that will disrupt queue data. For instance, a power interruption or server crash may wipe out the queue that's in volatile memory, but not the queue that's in non-volatile storage.

As the name suggests, a replication queue is a logically compact structure that contains information about file system objects that are to be replicated from one location to another. In this embodiment, replication is for the purpose of caching file system objects at a node of the clustered file system physically distant from the node storing the primary copy of the file system object (that is, caching the file system objects in physical storage 60b). Alternatively, replication could be performed, for example, for migrating a set of files from one physical location to another, or for creating a second, independent file system by creating copies of some or all of the objects of the first file system in a separately managed file system, where the second file system may or may not be hosted in a physically distinct location from the first file system.

The details recorded may differ between the two queues. For example, in this embodiment, to minimize the time cost of writing to non-volatile storage, the secondary queue only stores information identifying the files which are to be replicated, while the primary queue stores more detailed file change data which can be used to carry out replication by transferring only the part of each file which is being added or changed from the node storing the primary file copy to the node storing the cached file copy. If replication data must be recovered from the secondary queue, these extra details will not be present, and the whole file will need to be transferred to complete replication. Alternatively, the details recorded in each queue may be the same.

Processing proceeds to operation S265, where failure detection mod 365 determines that the data in the primary replication queue is no longer reliable. In the most dramatic cases such as a power interruption or system crash, this may be because the primary queue no longer exists. Alternatively, failure detection mod 365 may detect more subtle clues that accurate data may have been lost from the primary replication queue, such as by noting that a computed replication queue checksum no longer matches a stored checksum value. Here, someone has smashed the physical machine hosting the file system server with a hammer. When the server is restored on a new machine and connected to the file system storage units, failure detection mod 365 notes that there was a server failure and directs retrieval mod 370 to recover information about any replications pending at the time the failure occurred.

Processing proceeds to operation S270, where retrieval mod 370 retrieves information about pending replications from the secondary replication queue. This information may or may not be the same information that was lost, as discussed above, but is enough to allow the file system replication to recover smoothly from the point of interruption. Because the secondary replication queue is logically compact, there is no need, for example, to scan the entire file system searching for files tagged with a "replication needed" flag. Here, information about the write request from operation S255 is among the information retrieved.

Processing proceeds to operation S275, where replication mod 375 uses the retrieved information to replicate the results of the write request to the cached copy of the affected file. Replication mod 375 also performs replication under normal circumstances, without reliance on the secondary replication queue when the primary queue is functioning without issue.

Although the above example involves a cloud embodiment and deals with replication between physical storage locations, some embodiments of the present invention may be implemented in non-cloud environments and/or may deal with replication between virtual storage locations, regardless of the underlying physical support.

III. Further Comments and/or Embodiments

Some embodiments of the present invention recognize: (i) that an index node, or mode, is a data structure that can be used to represent a file system object (such as a file or a directory) and may include object attributes such as change metadata; (ii) that mode logging is used in journaling scenarios where a log mode is used to recover file system metadata for replay and mark the file system as clean for mounting purposes; (iii) that in some cases, file system log recovery can be used to detect changes performed at file system blocks; (iv) that by running a file system check to bring consistency back for mounting purposes, such a file system log recovery system can overcome the situation when abnormal shutdown results in data/metadata changes not being flushed to disk or other non-volatile storage; (v) that such a system does not, however, guarantee exactly the same file system as prior to the abnormal shutdown, but rather only a consistent file system (for instance, consistency among directory entries, free modes, and free disk blocks) so as to allow file system mounting without occasioning a kernel crash due to file system inconsistencies; (vi) that apart from file system consistency, a user may in some cases need to manually perform one or more file operations to fully return the file system to the desired state; and/or (vii) that recovery at the file system level is different than recovery of the replication process, as a file system may be consistent although the replication process itself has failed.

In contrast to such journaling scenarios, some embodiments of the present invention: (i) use a special mode-log-based system for file replication purposes; (ii) provide a high-performance method to quickly rebuild a replication queue lost due to unplanned failure while data replication was in-progress; and/or (iii) guarantee exactly the same structure, data, and/or metadata of the local and remote file systems/nodes after the recovery queue is rebuilt (and replication completes), without the use of a snapshot mechanism for determining changes based on the last good data and changed data. In at least some embodiments, there is not necessarily any guarantee that all user data will be saved, as this may be the responsibility of the local file system, but faithful replication of an existing local file system to one or more remote file system(s)/node(s) is guaranteed.

Some embodiments of the present invention: (i) recognize that the current state of the art uses snapshots and other mechanisms for recovery in a replication process; (ii) recognize that such a recovery system is expensive and/or slow for replication as an application (for example, a file system may have 100 file sets but replication needs to be done only on file set 1 and file set 2); (iii) replace "heavy" snapshots used for replication with "light" journaled logs (that is, structured log files) for replication recovery; (iv) replace snapshots with regular/journaled logs for applications such as file system backup, file system restore, and so on.

Some embodiments of the present invention add a new algorithm into the existing input/output (I/O) operations that a file system kernel performs. For example: (i) receive an I/O request at a local file system; (ii) for this I/O request, (a) log I/O request to file system, which will take care of flushing data to disk (or other file storage) based on file system settings, and (b) invoke a parallel thread to add this I/O to a file replication queue (in volatile storage, say) and also add it to a recovery log mode, a special mode file.

Some embodiments of the present invention recognize that conventional file replication software solutions: (i) rely on snapshots for gathering the changes made to a source file system and sending these changes to destination sites; (ii) create a recovery snapshot by scanning the dirty files after the replicating source server crashes and the state of replication is lost; (iii) freeze the file system from further operations during this snapshot, and freeze all input/output (I/O) requests during this time frame; and/or (iv) push this snapshot to an in-memory queue after gathering the changes which need to be synced to a destination cluster and start the replication operation again.

For instance, consider a typical scenario where a source cluster is replicating files to a destination cluster. In this setup, the source cluster is the cluster where files are modified by an application running on any cluster node, and this source cluster sends modified file data to the destination cluster. In the source cluster, one or many nodes are authorized to replicate changed data to destination cluster server node(s). Therefore, whenever a file is modified at the source cluster, the file data is saved to disk and in-parallel this data is recorded into a memory queue to replicate the changes to the destination server. As files are continuously modified at cache, they are marked as dirty (not yet replicated) and all changes are recorded serially to build the replication queue and start flushing changes to the destination server.

Any failure that occurs at the cache server results in failure of replication. Once the server is back, the file system is frozen and scanned for all dirty files (files which have changes at the cache that have not yet been synchronized to the destination) and a snapshot is created from the scan results. The file system is then unfrozen (allowing it to accept further changes), the memory queue is rebuilt, and the flushing operation to the destination server is re-started.

Some embodiments of the present invention recognize that a drawback to the process described above is that, by using a snapshot mechanism, there is a down time until the whole scanning of the cache for files which are dirty is completed—until then, all I/O needs to be placed on hold. Some embodiments of the present invention further recognize that this is not acceptable in real-time scenarios where changes are coming very frequently and at high speed.

Some embodiments of the present invention may therefore resolve this issue by using mode-logging-based file replication, and/or avoiding recovery snapshots to collect the change data on a source cluster by keeping changed data information inside a special recovery mode to optimize recovery operations to sync to a destination cluster.

For instance, whenever a file is modified at a source cluster, the file is marked as replication_dirty at the cache and the data is saved to local storage. In parallel with this, an entry is added to a special mode file with data like mode information, parent mode, dirty offset and length, new metadata, and so on. This approach permits recordation and maintenance of the dirty (non-replicated) data in a write-order fidelity manner, since every modification operation of a file at the cache is recorded into this "replication special mode file". Because this mode is part of the file system, it is leveraged by some embodiments of the present invention for purposes like, for example, the following:

(i) Distributed replication among cluster nodes to synchronize changes to achieve load balancing without any memory queue: every node is given a range of tasks out of the hash irrespective of the file; the replicating node maintains flags such as complete, incomplete, failure, in-transit, and so on against each task.

(ii) Recovery-like scenarios, such as where the source node doing the replication to the destination node goes down: once the source node is back online, the file system need not be frozen to scan the changed modes; instead, replication tasks are re-read from the replication mode (which takes much less time as compared to use of a snapshot mechanism); the replication tasks from the next hash list are guaranteed, and with no repetition using this method; such a scenario may benefit immensely from an mode-based replication method instead of a snapshot-based method.

(iii) Failover from one destination site to another destination site: here, the replication mode needs to be re-initialized and every mode from the mode list copied to create a task entry into this replication mode file; this will ease the operation to build a replication queue faster to copy ilist entries to mark files to replicate.

Some embodiments of the present invention involve file-based replication, and function in the following manner:

(i) Every file that is modified at the cache is marked as "replication dirty" and an entry to a replication mode file is added to record the changes. This operations can be blocking or non-blocking but is guaranteed to record every change. For example, if data is modified at the cache and a "replication dirty" bit is marked but the entry is not recorded, this can be confirmed by using an on/off bit on the mode. (During any crash or failure, this operation entry is replayed based on this bit into the "replication mode".)

(ii) Once the time to synchronize is triggered, replication starts reading this "replication mode file" to build a local replication task queue or to distribute the tasks to cluster nodes to replicate the changes.

(iii) Every node that is doing replication individually marks the status of a task given to it by using a status bit (such as in-transit, completed, blocked, failed, and so on). Once a task is marked complete, this is asynchronously deleted from the list and is not given back to any node. If any node records failure of the task, this is read back and the operation is re-tried.

(iv) When a node crash occurs, the local in-memory queue is lost and replication is halted. Once the node is back online, (a) any operation that was not recorded to the "replication mode" file is corrected (the entries are corrected, making the "replication mode" list accurate), (b) the file system is marked open, every new modification is synced to the file system and marked "replication dirty", and a recorded task is appended in the "replication mode" file (as above), and (c) for operations marked "pending", the flag is read again by replicating nodes(s) and synchronizing modified data to the destination is started.

Some embodiments of the present invention may include one, or more, of the following features, characteristics and/or advantages: (i) optimize file-based cluster-to-cluster replication by avoiding snapshots and using a recovery mode; (ii) mark a "replication dirty" bit in an mode only as a backup in case the "changed mode" file is corrupted, not recovered, or other like cases, wherein the system may fail back to the snapshot method for resuming (recovering) from that particular event (the bit is just kept for failback to the snapshot mechanism); (iii) do not include a "replication dirty" bit; (iv) avoid marking a dirty bit by making multiple replicas of the "change mode" ("replication mode") so that if the original change mode is deleted or corrupted then recovery can be based on rebuilding using its replica mode; (v) handle recovery failure faster and more robustly compared to conventional methods; (vi) maintain/record the write order coming to a cluster as per the cluster/local mount file system; (vii) receive I/O recorded by the cluster in a special mode file to build a recovery queue; (viii) use optimizations to filter out operations like delete and so forth as-is, as these operations can still be filtered out during the queue rebuild process; and/or (ix) facilitate the reduction in downtime by using a "recovery mode" file.

Figure 6:
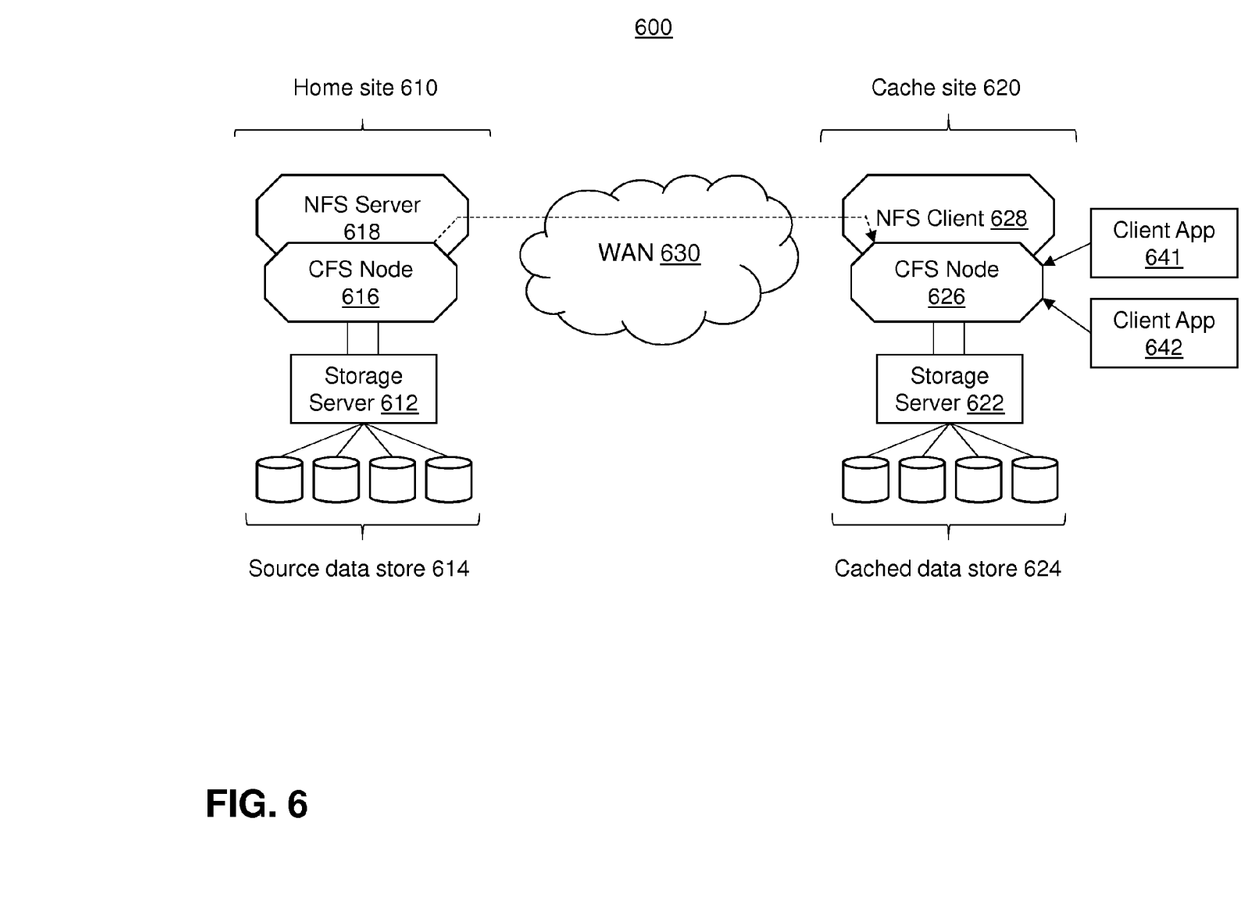
FIG. 6 is a block diagram of a second embodiment of a system according to the present invention.

Shown in FIG. 6 is system 600 illustrating an embodiment architecture for the present invention. System 600 includes: home site 610, including network file system (NFS) server 618, clustered file system (CFS) node (computational member unit) 616, storage server 612, and source data store 614; cache site 620, including NFS client 628, CFS node 626, storage server 622, and cached data store 624; wide area network (WAN) 630; and client applications 641 and 642.

A scalable, high-performance, file system caching layer is integrated with the clustered file system to provide a persistent data store at cache site 620. The persistent data store masks WAN latencies and outages by using the clustered file system to cache massive data sets, allowing data access and modifications even when a remote storage cluster (that is, home site 610 here) is unavailable. Home site 610 is the source of original data and cache site 620 caches data locally in persistent cached data store 624 for client applications 641 and 642. When a client application first tries to access any file, the file is fetched from the home site and copied to the CFS at cache site 620. Subsequent requests for the file are served from local cache site 620, eliminating the need for bandwidth across WAN 630. The design of the file system caching layer takes care of keeping the cache site file copy in sync with the home site file copy. File data is transferred using a protocol where home site 610 acts as an NFS server and cache site 620 acts as an NFS client. The CFS file system at both sites stores files on devices managed by each site's respective storage server(s). Apart from caching, the file system caching layer is also useful for active migration purposes, where data from home site 610 can be migrated to cache site 620 while cache site 620 continues to serve applications even while migration is incomplete. Note that the designations "home site" and "cache site" are with respect to a particular file, and that other systems may have more than two CFS nodes.

Some embodiments of the present invention recognize the following facts, potential problems and/or potential areas for improvement with respect to the current state of the art: (i) file replication software (such as might be conventionally used in the scenario of FIG. 6) often relies on a recovery snapshot to collect the changes made to a source file system and replicate those changes to a destination file system in case of failure; (ii) during the file replication, if any failure (like a system crash, software crash, and so on) is observed then the state of replication queue is lost; (iii) once the node is back online, a recovery program is initiated prior allowing I/O on that file system; (iv) in a typical recovery program, once the source site is back online after a crash and file system is made available, the source file system is first frozen and all modes are scanned through to gather information about dirty modes which have not yet been replicated to the destination file system at the time the crash was observed; (v) once the whole file system is scanned through to find the dirty modes, a "recovery snapshot" is created that contains this information, as needed for replicating those changes to the destination site; (vi) the in-memory queue is rebuilt by adding these changes and the file system is then thawed; (vii) during this process, however, the file system is not open for I/O (it is in quiesce/freeze mode) until the state of file replication is rebuilt; and/or (viii) once the state of replication is rebuilt, further I/O is then permitted to make modifications on the source file system and add these modifications to the queue as regular operations.

Further, some embodiments of the present invention recognize that, following creation of the snapshot: (i) the source file system is unfrozen and I/O on the source file system is allowed; (ii) new I/O operations are recorded to the local file system, the dirty flag is marked, and in-parallel the operation is added to the queue for synchronization; and/or (iii) if any failure occurs, same process will be performed again.

Some embodiments of the present invention recognize that performing the above-described process may require some I/O downtime. Specifically, they recognize that downtime may include the following: (i) post recovery—the file system comes back online after a failure; (ii) the file system is first frozen (it stops accepting I/O requests during this time frame); (iii) the file system is scanned through to find the dirty modes which are not yet replicated to the destination; and/or (iv) a snapshot of gathered data is created to rebuild the in-memory queue using the snapshot so that replication can be started. Following this process, the file system is thawed (unfrozen) to again allow I/O.

Some embodiments of the present invention recognize: (i) that the above process adds to system downtime for business continuity purposes; (ii) that every time replication status is lost due to a crash or other failure, this whole process is repeated; (iii) that this process is costly.

Some embodiments of the present invention recognize that a full file replication mechanism to replicate changes using a recovery snapshot and then creating an in-memory queue to resume replication might be as follows: (i) active I/O requests are coming on the local file system—changed data needs to be replicated; (ii) data is recorded in the local file system and the mode is marked as dirty; (iii) an in-memory replication queue is built to replicate changes; (iv) a failure is observed at the source file system due to a crash or other problem; and (v) recovery is triggered to get the lost state of replication as follows: (a) the source file system is frozen (quiesced) for all I/O operations, (b) the source file system is scanned through to discover all dirty ides, (c) a recovery snapshot is created to rebuild the in-memory queue for replication, and (d) the local file system is thawed (unfrozen) to start accepting I/O requests and continue with normal operations.

Some embodiments of the present invention recognize that the downtime cost to this type of recovery approach is significant. Consider a case where a source file system is replicating millions of files to the destination file system. On the source file system, there are applications modifying data and these changes are being done at very high rate (so that the in-memory queue is very much occupied). All data changes are being logged to the in-memory queue and are recorded in parallel in the local file system with the file being marked as "dirty" on local file system itself. This flag is not cleared until all changes have been replicated to the destination for this mode (that is, until the source and destination files are in sync). This "dirty" flag is on the disk (that is, on the persistent file store). Any failure (like a crash, memory pressure, and so forth) observed during the replication of data results in disruption/failure of the whole queue. So, during these types of failures, the status of replication is lost and no clue is available except by checking the "dirty" flag on disk and queueing these records again for replication. Finding dirty modes from disk is a costly operation.

Some embodiments of the present invention recognize: (i) that this down-time is even higher when the file system is large (sizes into the peta byte range are common in today's data centers) and contain billions of modes; (ii) that a recovery process using a snapshot mechanism to collect the required information is a time consuming method; (iii) that using a snapshot mechanism actually adds to the downtime to applications post recovery while scanning through all the files and finding dirty modes and creating a snapshot and rebuilding the queue; (iv) that I/O will be frozen until this process is complete; and/or (v) that this is not a good or acceptable way of performing recovery in a real-time scenario where changes are coming very frequently and at a high rate.

In contrast to the above-described process, some embodiments of the present invention avoid scanning a file system to collect dirty mode information in case of failure observed on the source file system site during file replication. Instead of using a snapshot to rebuild the replication queue, some embodiments of the present invention use a special "recovery mode" to log all dirty data information in this mode and read this mode in case the in-memory replication queue is lost. By using this logic, such embodiments avoid scanning of the whole file system and reduce the time to quickly rebuild the replication queue.

In some embodiments of the present invention downtime is minimized by avoiding snapshots and scanning of the whole file system by use of mode-logging-based file replication. Data that is modified at the source file system is recorded on the file system and is (optionally) marked as dirty via an on-disk bit. Change information is also added to a "recovery special" mode in parallel with this recordation and is sent to an in-memory queue for replication.

Figure 7:
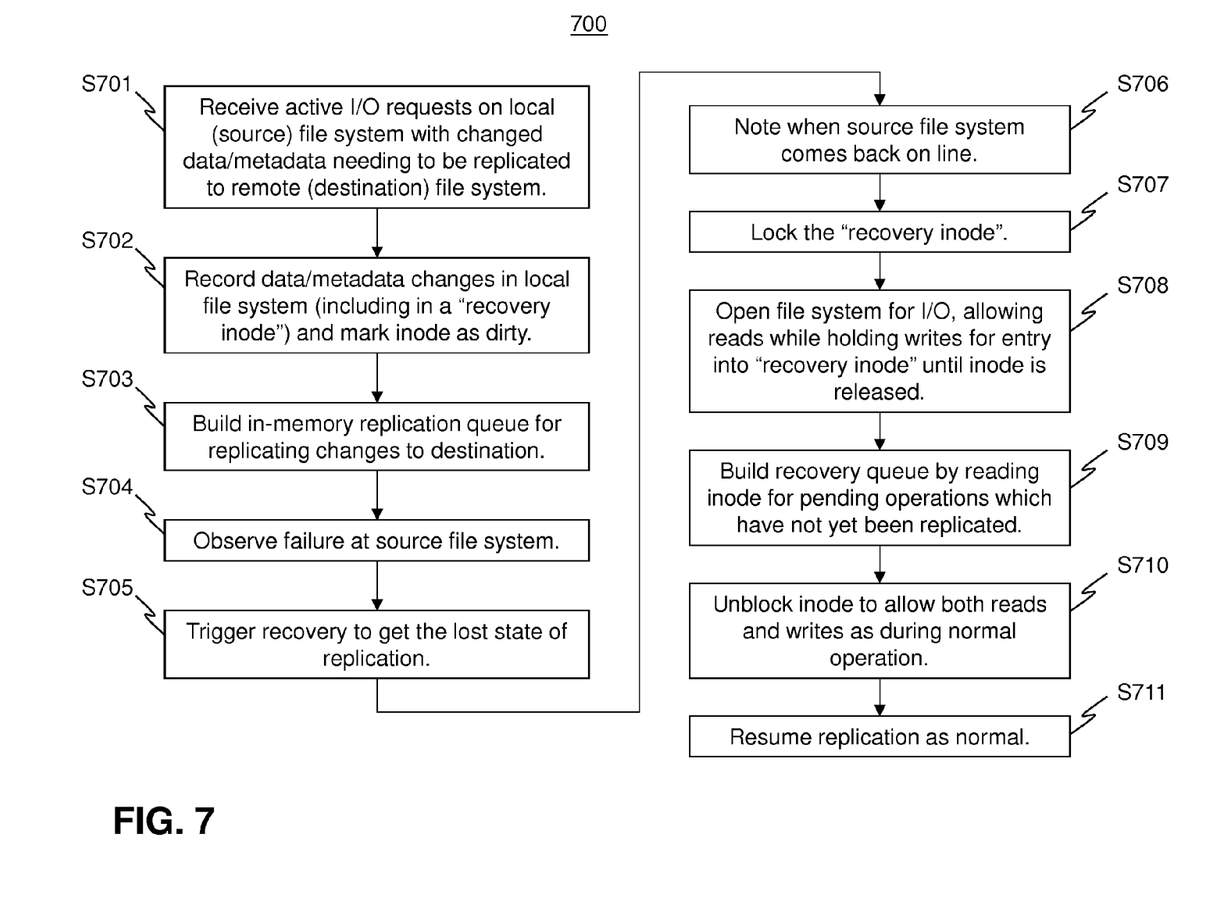
FIG. 7 is a flowchart of the second embodiment system.

Shown in FIG. 7 is flowchart 700, depicting a set of actions according to an embodiment of the present invention. The actions include recording a change in a "recovery mode" file (stored, for example, in source data store 614—see FIG. 6) whenever a file is modified on a source file system. This special "recovery mode" special file may be created, for instance, when creating the source file system.

At action S701, I/O requests are coming into the source file system; change data needs to be replicated to a remote location. At action S702, this information is recorded in the file system and that file's dirty bit is marked; this mode information is also recorded/appended in a "recovery mode". In parallel with this, the operation is added to the in-memory replication queue (action S703). At action S704, a failure is observed at the source file system (due to a crash, for instance) and as a result the replication queue is lost. At actions S705 and S706, the file system comes back online and a recovery mechanism is triggered to restore replications that were pending at the time of the system failure. Once the file system is back online, it is opened for I/O but the "recovery mode" is locked; pending operations which have been recorded already but not yet replicated to the destination file system are read first and the replication queue (recovery queue) is quickly rebuilt (actions S707, S708, and S709). During this part of the recovery process, any read requests that arrive are serviced without issue, while any modifications (writes) that arrive to the file system are held for entry into the recovery mode until reading of this recovery mode is complete and the mode is released. The "recovery mode" is then unlocked (unblocked) (action S710) and I/O read/write processing continues in the usual fashion (action S711) as described in actions S701 through S703, above. Once changes are replicated to the destination, the respective mode information is removed from the "recovery mode" file, and the mode is non-dirty (and thus no longer marked as dirty).

Recording this information structure on an on-disk "recovery mode" file allows it to be used to quickly rebuild the replication queue after a disruption. Since all changes are being logged in parallel and the on-disk "recovery mode" thus already has the last status of replication, scanning through the file system to collect the change data can be avoided. The replication queue is rebuilt using this "recovery-inode" file instead.

Some embodiments of the present invention use a variation of the process depicted in FIG. 7 that includes a further optimization to avoid whole-file replication. In these embodiments, changed mode information is recorded along with information regarding the corresponding changes performed to this mode. For example, modified/deleted/appended offset-length pair, changed metadata, directory information, and so on may be recorded. By keeping this extra structure inside the "recovery mode" for every changed mode, replicating the whole file is avoided. Instead, just the changed data that corresponds to the changed mode is sent, reducing bandwidth usage considerably. With or without this optimization, however, the approach of FIG. 7 may save time and allow a file system to be opened for I/O more quickly than using a conventional snapshot approach, and can be applied to any file replication software scenario, including storage clouds, other emerging storage industry workloads, and/or scenarios where file-based replication and synchronization is performed using a scalable, high-performance file system caching layer integrated with a cluster file system.

Some embodiments of the present invention perform one or more of the following actions: (i) create a special "recovery mode" special file while creating a source file system; (ii) locally save every file modified at the source file system; (iii) mark a "replication dirty" flag (on-disk flag) on this mode; (iv) added a change data entry to the "recovery mode", including information such as: (a) mode information, (b) changed offset-length pair of this mode, and/or (c) metadata change information corresponding to this mode (for instance, add such information to a special on-disk mode file that is created at the time of creation of the file system and is not changed, even after reboot, other than by the controlled addition/deletion of replication tasks as they accrue/complete; this mode stores the above information on disk as it is queued in parallel for replication to the destination site, such that during any disruptive event, scanning of the file system is not required for recovery); (v) in parallel with the above, add this change data to an in-memory queue for replication; (vi) guarantee this operation, which may be blocking or non-blocking, recovers every change (so for example if data is modified at the source file system and marked "replication dirty" but this entry is not recorded into the "recovery mode", confirm this by using an on/off bit on the mode; if this entry was missed during any crash/failure, recovery can replay this operation entry into the "replication mode" based on this bit to ensure consistency); (vii) once the time interval to synchronize is triggered, have replication start replicating the recorded changes from the replication queue (this task queue can be replicated by one host or the tasks can be distributed to other cluster nodes to replicate the changes); and/or (viii) while doing replication, mark status against a task by setting a status bit (to a state such as in-transit, completed, blocked, failed, and so on) and once the task is marked complete, delete it from the list (alternatively, if any node records failure of the task, this is read back and the operation is retried). Every changed entry which is recorded against the mode is not removed until positive acknowledgment is received. This helps avoid sending changed data again in case of a recovery situation. Once data is sent from this list and the task is completed, it is deleted from the "recovery mode", intelligently removing the unnecessary burden of resending already sent data. If the sending task fails, it is re-queued so the operation can be performed again.

In case of a node crash, daemon crash, or the like, the local in-memory queue is lost and replication is halted. The last state of replication is no longer available. Once the file system is back online, some embodiments of the present invention therefore perform one or more of the following actions: (i) correct the problem via recovery if any operation was not recorded to the "replication mode" file—the entries are corrected and the "replication mode" list is made accurate for further processing; (ii) mark the file system open for reads and writes (with hold for writes)—only the "recovery mode" is locked, and locked such that this mode is read, and the recorded entries of changed data which were not yet sent to the destination file system are read, but all writes coming to the source file system are held until reading of the pending operations is complete and the in-memory queue has been rebuilt; (iii) once the queue is rebuilt, unlock the "recovery mode" and log all operations which are new (arrived post recovery); (iv) during the lock of the "recovery mode", mark new incoming data which has been modified recently "recovery dirty" and make to wait until entry is made in the "recovery mode" (thus such an operation waits to grab the lock of the "recovery mode" for adding an entry of modified data until this mode has been read and the in-memory queue is rebuilt for replication, so this operation may hold for a while); (v) once the "recovery mode" is read and the in-memory queue is rebuilt, unlock the "recovery mode" for other operations—since the queue is again available, normal operations can be resumed; and/or (vi) once a replication task is completed, delete the entry from the "recovery mode" and once all operations belonging to the mode are done, remove the "replication dirty" flag.

Some embodiments of the present invention recognize: (i) that a potential problem is that the recovery mode may get corrupted or lost; (ii) that this problem can be overcome by keeping replicas of the recovery mode, and/or by falling back to a conventional snapshot mechanism to collect dirty mode information and rebuild the queue, populating the "recovery mode" from scratch; and/or (iii) that this is a rare situation, but a dirty bit can be kept just for the purpose of falling back to the conventional snapshot mechanism.

Some embodiments of the present invention may include one, or more, of the following features, characteristics and/or advantages: (i) avoid scanning and freezing of a file system to collect dirty mode information in case of a failure observed on a source file system site during file replication; (ii) rebuild a replication queue using a special "recovery mode" (for instance, an on disk mode) to log all dirty data information, which is read in case the in-memory replication queue is lost; (iii) avoid scanning of the whole file system and quickly rebuild the replication queue; (iv) store data on-disk or in some other form of persistent storage, so data persists across reboots; (v) minimize system downtime by avoiding scanning of the whole file system; (vi) use mode-logging-based file replication; (vii) record on a file system all data which is modified at a source file system, mark dirty on-disk bit, add change information to a "recovery special" mode in parallel, and queue this to memory for replication; (viii) log all changes in parallel such that an on-disk "recovery mode" reflects the last status of replication; (ix) avoid scanning through a file system to collect change data; and/or (x) rebuild a replication queue using a "recovery-inode" file.

Some embodiments of the present invention may include one, or more, of the following features, characteristics and/or advantages: (i) avoid whole-file replication by recording changed mode information along with information regarding the corresponding changes performed on this mode (for example, modified/deleted/appended offset-length pair, changed metadata, directory information, and so on); (ii) keep this extra structure inside the "recovery mode" for every changed mode so as to avoid replication of the whole file and instead just send the changed data that corresponds to the mode of interest, reducing bandwidth usage drastically; (iii) include mode logging consistency (for instance, using an on/off bit on the mode so that, if data is modified at the source file system and marked "replication dirty" but the entry is not recorded into the "recovery mode", this is caught on recovery); (iv) do not log from a kernel; (v) avoid an expensive scan process; (vi) do not use a kernel-resident data structure; (vii) do not require the whole logging operation to be done again after a failure is observed; (viii) keep change information as "persistent" information on disk; (ix) during any failure, avoid scanning/snapshots to recover and rebuild the replication queue quickly; (x) do not penalize performance at the application level; (xi) eliminate the need for a scan or file system freeze; (xii) include special optimizations during recovery cases; (xiii) keep a copy of the mode recovery in memory for faster replication; (xiv) use a recovery mode; (xv) mark modified data at a source file that is recorded on a file system as a dirty on-disk bit and add the change information to a special "recovery mode" in parallel and queue this in memory for replication; (xvi) solve the recovery problem at the file system level; (xvii) avoid scanning and taking a snapshot of the file system; and/or (xviii) provide fast replication in case of a recovery event.

Some embodiments of the present invention recognize: (i) that most file systems use snapshots to scan the file system and collect changed data (which are not yet replicated from a source to a destination); (ii) that using snapshots for detecting changed data and for replication status rebuilding is time consuming and adds to downtime once a file system is back online.

Some embodiments of the present invention may include one, or more, of the following features, characteristics and/or advantages: (i) rebuild a file replication queue quickly by keeping all entries in a log mode inside the file system (an on-disk mode file); (ii) completely avoid a snapshot mechanism; (iii) use an "on-disk log mode" inside the file system for maintaining file replication status that tracks information of each and every file such that once a failure is observed during replication, the replication queue can be quickly built by first reading this mode to collect all information about pending replication; (iv) store file change information "on disk" in this special mode, and in parallel queue it for replication to a destination site; (v) avoid scanning of the file system during a system event (failure); (vi) update this special mode based on completion stats of replication, such as by adding/marking/deleting entries based on work status; (vii) querying this special mode even when the file system is up; (viii) contribute major time savings once a file system is back online by using this log mode during recovery for replication status rebuilding; (ix) clean the file system and recover from file system failures; (x) log changes for the purpose of keeping the life cycle of file data so that replication can be guaranteed using this special mode and downtime can be minimized by quickly rebuilding the replication queue and allow further I/O once the queue is rebuilt; (xi) eliminate the need for a scan and file system freeze; (xii) avoid scanning of a live file system; (xiii) lock a single mode and read it quickly for rebuilding a replication queue; (xiv) allow access to the file system once the recovery mode is read; (xv) read recovery mode for changes first made to the file system, logging later writes to disk and appending them to the recovery queue; and/or (xvi) write data to the disk and to the log mode and in parallel to the recovery queue for fast recovery.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Inode: a data structure and/or structured log file that can be used to represent a file system object (such as a file or a directory); may include object attributes, such as change metadata.

Write request: a request to change data and/or metadata; includes operations such as create, delete, modify, truncate, and so on; excludes requests that only read or otherwise observe data and/or metadata.

What is claimed is:

1. A computer-implemented method comprising:
   receiving, at a first file system location, a plurality of requests to write to one or more file system objects at the first file system location;
   recording details about the plurality of requests in both a primary and a secondary replication queue; and
   responsive to detection of data loss in the primary replication queue, retrieving the details about the plurality of requests from the secondary replication queue;
   wherein:
   both the primary and the secondary replication queues are at the first file system location; and
   the primary and secondary queues differ, at least in part, as to types of failures which will cause data loss.

2. The computer-implemented method of claim 1 further comprising:
   responsive to receiving the plurality of requests, writing to a first copy of the one or more file system objects at the first file system location; and
   responsive to the retrieved details, replicating results of the plurality of write requests to a second file system location by writing to a second copy of the one or more file system objects at the second file system location.

3. The computer-implemented method of claim 2 wherein:
   the details recorded in the secondary replication queue identify which file system object(s) are affected by the plurality of requests; and
   the results of the plurality of write requests are replicated to the second file system location by transferring the entirety of the file system objects affected by the plurality of write requests from the first file system location to the second file system location.

4. The computer-implemented method of claim 2 wherein:
   the details recorded in the secondary replication queue include change data for the file system objects affected by the plurality of write requests; and
   the results of the plurality of write requests are replicated to the second file system location by transferring only changed portions of the file system objects affected by the plurality of write requests from the first file system location to the second file system location.

5. The computer-implemented method of claim 1 wherein the details recorded in the secondary replication queue survive a restart of the first file system location.

6. The computer-implemented method of claim 1 wherein:
the primary replication queue is an in-memory data structure stored in volatile storage at the first file system location; and
the secondary replication queue is an inode stored in non-volatile storage at the first file system location.

7. The computer-implemented method of claim 1 wherein the first file system location is a first node of a clustered file system and the second file system location is a second node of the clustered file system.

8. A computer program product comprising a non-transitory computer readable storage medium having stored thereon:
first instructions executable by a device to cause the device to receive, at a first file system location, a plurality of requests to write to one or more file system objects at the first file system location;
second instructions executable by the device to cause the device to record details about the plurality of requests in both a primary and a secondary replication queue; and
third instructions executable by the device to cause the device to retrieve, responsive to detection of data loss in the primary replication queue, the details about the plurality of requests from the secondary replication queue;
wherein:
both the primary and the secondary replication queues are at the first file system location; and
the primary and secondary queues differ, at least in part, as to types of failures which will cause data loss.

9. The product of claim 8 wherein the non-transitory computer readable storage medium has further stored thereon:
fourth instructions executable by the device to cause the device to write, responsive to receiving the plurality of requests, to a first copy of the one or more file system objects at the first file system location; and
fifth instructions executable by the device to cause the device to replicate, responsive to the retrieved details, results of the plurality of write requests to a second file system location by writing to a second copy of the one or more file system objects at the second file system location.

10. The product of claim 9 wherein:
the details recorded in the secondary replication queue include change data for the file system objects affected by the plurality of write requests; and
the results of the plurality of write requests are replicated to the second file system location by transferring only changed portions of the file system objects affected by the plurality of write requests from the first file system location to the second file system location.

11. The product of claim 8 wherein the details recorded in the secondary replication queue survive a restart of the first file system location.

12. The product of claim 8 wherein:
the primary replication queue is an in-memory data structure stored in volatile storage at the first file system location; and
the secondary replication queue is an inode stored in non-volatile storage at the first file system location.

13. The product of claim 8 wherein the first file system location is a first node of a clustered file system and the second file system location is a second node of the clustered file system.

14. A computer system comprising:
a processor(s) set; and
a computer readable storage medium;
wherein:
the processor set is structured, located, connected and/or programmed to execute instructions stored on the computer readable storage medium;
the instructions include:
first instructions executable by a device to cause the device to receive, at a first file system location, a plurality of requests to write to one or more file system objects at the first file system location;
second instructions executable by the device to cause the device to record details about the plurality of requests in both a primary and a secondary replication queue; and
third instructions executable by the device to cause the device to retrieve, responsive to detection of data loss in the primary replication queue, the details about the plurality of requests from the secondary replication queue;
both the primary and the secondary replication queues are at the first file system location; and
the primary and secondary queues differ, at least in part, as to types of failures which will cause data loss.

15. The system of claim 14 wherein the instructions further include:
fourth instructions executable by the device to cause the device to write, responsive to receiving the plurality of requests, to a first copy of the one or more file system objects at the first file system location; and
fifth instructions executable by the device to cause the device to replicate, responsive to the retrieved details, results of the plurality of write requests to a second file system location by writing to a second copy of the one or more file system objects at the second file system location.

16. The system of claim 15 wherein:
the details recorded in the secondary replication queue identify which file system object(s) are affected by the plurality of requests; and
the results of the plurality of write requests are replicated to the second file system location by transferring the entirety of the file system objects affected by the plurality of write requests from the first file system location to the second file system location.

17. The system of claim 15 wherein:
the details recorded in the secondary replication queue include change data for the file system objects affected by the plurality of write requests; and
the results of the plurality of write requests are replicated to the second file system location by transferring only changed portions of the file system objects affected by the plurality of write requests from the first file system location to the second file system location.

18. The system of claim 14 wherein the details recorded in the secondary replication queue survive a restart of the first file system location.

19. The system of claim 14 wherein:
the primary replication queue is an in-memory data structure stored in volatile storage at the first file system location; and the secondary replication queue is an inode stored in non-volatile storage at the first file system location.

20. The system of claim 14 wherein the first file system location is a first node of a clustered file system and the second file system location is a second node of the clustered file system.

\* \* \* \* \*